US011827182B2

(12) United States Patent
Myers

(10) Patent No.: US 11,827,182 B2
(45) Date of Patent: Nov. 28, 2023

(54) MODULAR TOOL BAG

(71) Applicant: Gary Andrew Myers, Chandler, AZ (US)

(72) Inventor: Gary Andrew Myers, Chandler, AZ (US)

( * ) Notice: Subject to any disclaimer, the term of this patent is extended or adjusted under 35 U.S.C. 154(b) by 0 days.

(21) Appl. No.: 17/390,582

(22) Filed: Jul. 30, 2021

(65) Prior Publication Data

US 2022/0032848 A1    Feb. 3, 2022

Related U.S. Application Data

(60) Provisional application No. 63/058,668, filed on Jul. 30, 2020.

(51) Int. Cl.
| | |
|---|---|
| *B60R 7/04* | (2006.01) |
| *A45C 11/24* | (2006.01) |
| *A45C 13/10* | (2006.01) |
| *A45C 13/02* | (2006.01) |

(52) U.S. Cl.
CPC ............ *B60R 7/043* (2013.01); *A45C 11/24* (2013.01); *A45C 13/02* (2013.01); *A45C 13/103* (2013.01)

(58) Field of Classification Search
CPC ......... B60R 7/043; A45C 11/24; A45C 13/02; A45C 13/103
USPC ...................................................... 224/275
See application file for complete search history.

(56) References Cited

U.S. PATENT DOCUMENTS

| | | | | |
|---|---|---|---|---|
| 5,392,973 | A * | 2/1995 | Benson | A45F 5/00 224/625 |
| 5,524,802 | A * | 6/1996 | Benson | A45C 1/04 224/660 |
| 7,055,682 | B1 * | 6/2006 | Domotor | A45C 13/02 206/214 |
| 8,127,382 | B1 * | 3/2012 | Plascencia | A47G 9/1045 5/639 |
| 8,167,131 | B1 * | 5/2012 | Anderson | A45F 3/02 190/102 |
| 11,278,095 | B1 * | 3/2022 | Chan | A45C 11/00 |
| 2004/0182664 | A1 * | 9/2004 | Milionta | A01K 97/06 190/110 |
| 2006/0283899 | A1 * | 12/2006 | Hill | B60R 7/043 224/400 |
| 2007/0044877 | A1 * | 3/2007 | Davidoff | A45C 13/02 190/110 |
| 2007/0246389 | A1 * | 10/2007 | Marcello | A45C 11/00 206/472 |

(Continued)

*Primary Examiner* — Peter N Helvey
(74) *Attorney, Agent, or Firm* — Schmeiser, Olsen & Watts LLP

(57) ABSTRACT

A modular tool bag system may have organizers each having a planar body that is foldable to form an inner volume between two halves. The organizers may be opened or closed, with a zipper, and configured to lay flat on a supporting surface, with no resistance, when open. A number of pouches, with a variety of transparent pockets for containing tools, may be attached to the inner surface of each organizer by hook and loop fasteners. Multiple organizers may be inserted, parallel to each other, into a tool bag, such that the spines of the organizers remain visible through the tool bag opening when the tool bag is open. The spines of the organizers may have labels for identification. A user may pull an organizer from the bag, open and lay it flat on a surface, and detach a pouch to use specific tools.

6 Claims, 13 Drawing Sheets

(56) References Cited

U.S. PATENT DOCUMENTS

| | | | | |
|---|---|---|---|---|
| 2013/0126286 A1* | 5/2013 | Chehebar | ............ | A45C 13/008 |
| | | | | 190/108 |
| 2013/0134160 A1* | 5/2013 | Klein | ................... | A45C 7/0086 |
| | | | | 220/23.83 |
| 2014/0064823 A1* | 3/2014 | Benefield | ................. | B42F 5/00 |
| | | | | 402/4 |
| 2014/0262851 A1* | 9/2014 | Adler | ..................... | A45C 11/24 |
| | | | | 29/428 |
| 2014/0346207 A1* | 11/2014 | Mccallister | ............... | B62B 9/26 |
| | | | | 224/409 |
| 2019/0133303 A1* | 5/2019 | Thiel | ................... | H01M 50/256 |
| 2019/0343254 A1* | 11/2019 | Schroeder | ............. | A45C 13/36 |
| 2020/0305565 A1* | 10/2020 | Maman | ................ | A45C 7/0086 |
| 2021/0274899 A1* | 9/2021 | Speck | .................. | A45C 7/0095 |
| 2021/0361045 A1* | 11/2021 | Wood | ..................... | A45C 11/26 |
| 2022/0032848 A1* | 2/2022 | Myers | ................... | A45C 11/24 |

\* cited by examiner

MODULAR TOOL BAG

CROSS REFERENCE TO RELATED APPLICATION

This application claims priority to U.S. Provisional Patent Application Ser. No. 63/058,668, filed Jul. 30, 2020, the disclosure of which is hereby incorporated entirely herein by reference

BACKGROUND OF THE INVENTION

Technical Field

This invention relates generally to tool bags and particularly to a modular tool bag system.

State of the Art

Conventional tool bags are commonly used by tradesmen, hobbyists, emergency medical and fire technicians, and others, to organize, carry, and protect the owner's tools. They may comprise any of a variety of interior and/or exterior pockets and/or storage compartments. They may be made of flexible materials, such as rugged fabric, polyester, or leather, for example, having any of a variety of handles and/or shoulder straps, making them light-weight and easily portable.

Because tools may be difficult to access in many conventional tool bags, and because a user may wish to carry only a limited number of tools from a bag, for a particular purpose, some smaller conventional tool bags are intended to carry a limited number of tools and may be intended to "roll out" into a flat configuration, for example. However, many such roll-out bags tend to resist lying flat.

Accordingly, what is needed is an improved tool bag system for organizing, carrying, and protecting tools.

SUMMARY OF THE INVENTION

The present invention relates to tool bags and particularly to a modular tool bag system.

A modular tool bag system may comprise at least one organizer comprising a substantially planar body that is foldable along a midline thereof to form an inner volume between two halves thereof. The at least one organizer may be transitioned between a closed configuration, wherein the two halves are folded together, and an open configuration, wherein the two halves are configured to lay flat on a supporting surface. It is an advantage of the at least one organizer of a modular tool bag system that the at least one organizer may be laid completely flat, with no resistance, on a supporting surface when in an open configuration. In some embodiments, an organizer may be secured in a closed configuration along three open sides by a zipper coupled thereto.

The inner surface of an organizer may be lined with a loop fabric of a hook and loop fastener. At least one pouch may removably coupled to the inner surface by a hook fabric of a hook and loop fastener. A plurality of pouches may be removably coupled to the inner surface such that they may be easily removed from the organizer and replaced again.

In an embodiment, a pouch may comprise at least one main zippered pocket for containing tools, wherein each of the pockets may be transparent except the rear surface of the pouch may be opaque.

A modular tool bag system may further comprise a tool bag configured to receive a plurality of organizers. In some embodiments, a plurality of organizers may be inserted, parallel to each other, into the tool bag, such that the spines of the organizers remain visible through the tool bag opening when the tool bag is open.

The foregoing and other features and advantages of the present invention will be apparent from the following more detailed description of the particular embodiments of the invention, as illustrated in the accompanying drawings.

BRIEF DESCRIPTION OF THE DRAWINGS

A more complete understanding of the present invention may be derived by referring to the detailed description and claims when considered in conjunction with the Figures, wherein like reference numbers refer to similar items throughout the Figures, and:

DETAILED DESCRIPTION OF EMBODIMENTS OF THE INVENTION

Figure 1:
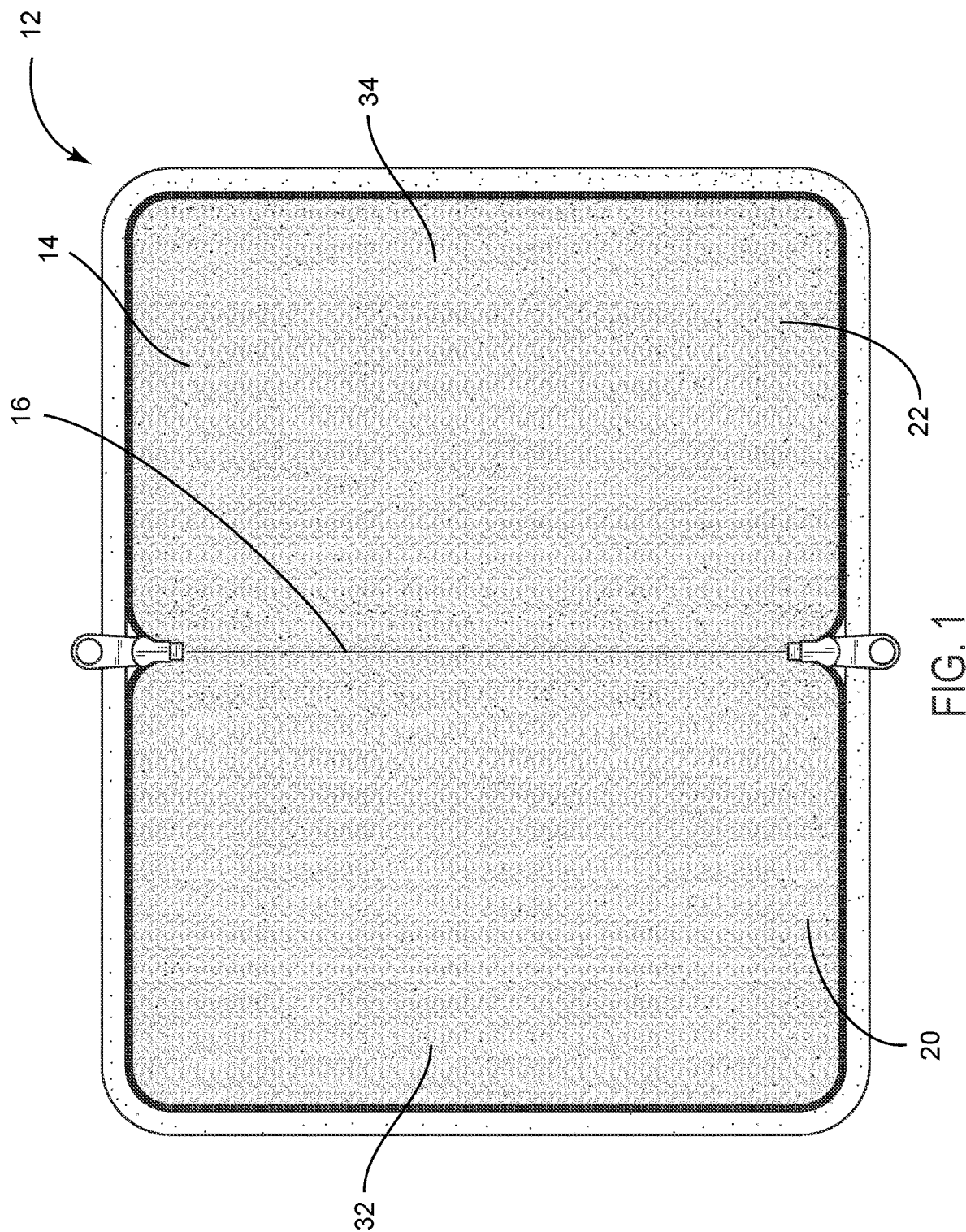
FIG. 1 is a perspective view of an organizer, of a modular tool bag system, in an open configuration, according to an embodiment.
Figure 2:
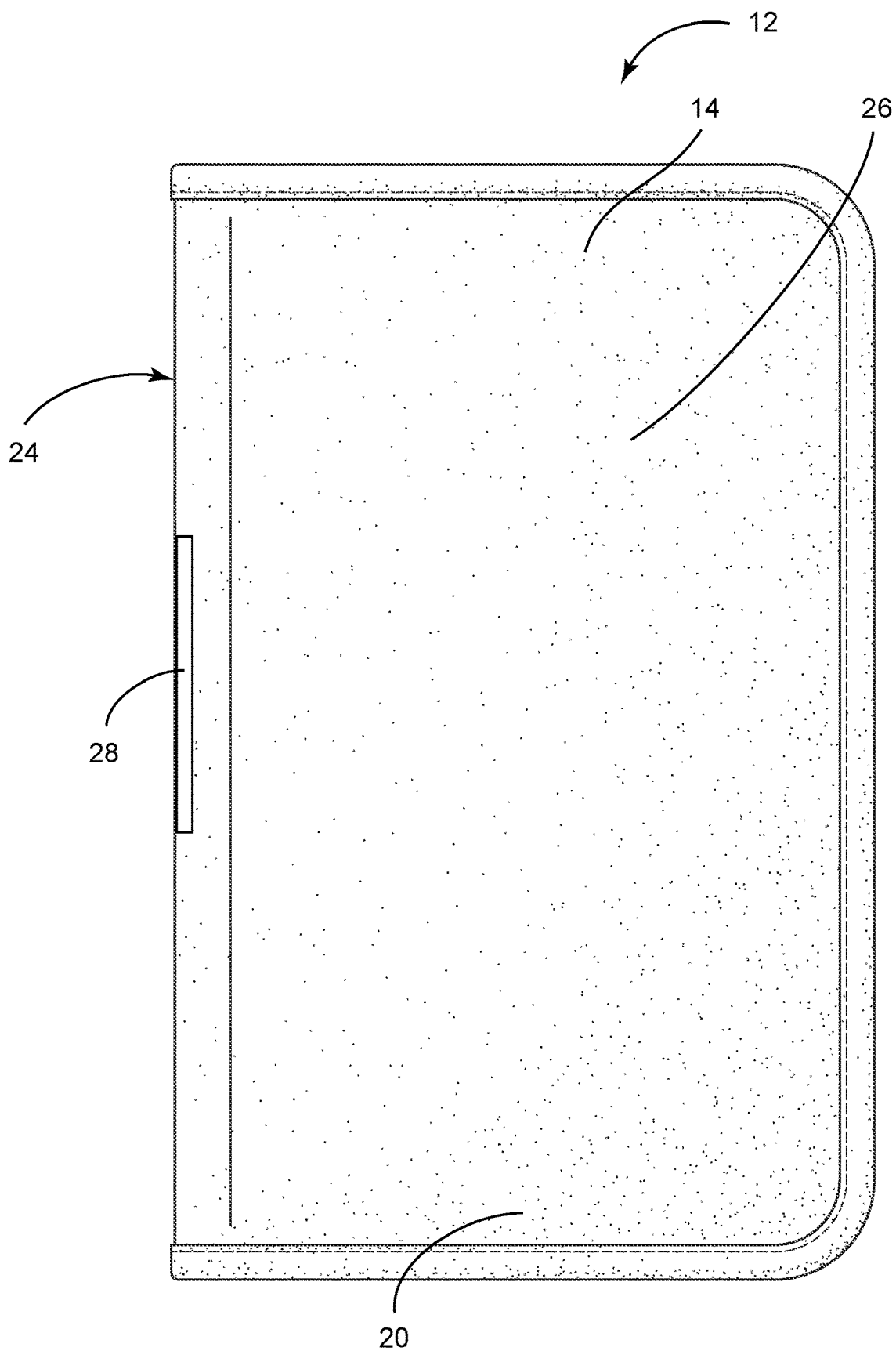
FIG. 2 is a perspective view of an organizer, of a modular tool bag system, in a closed configuration, according to an embodiment.
Figure 3:
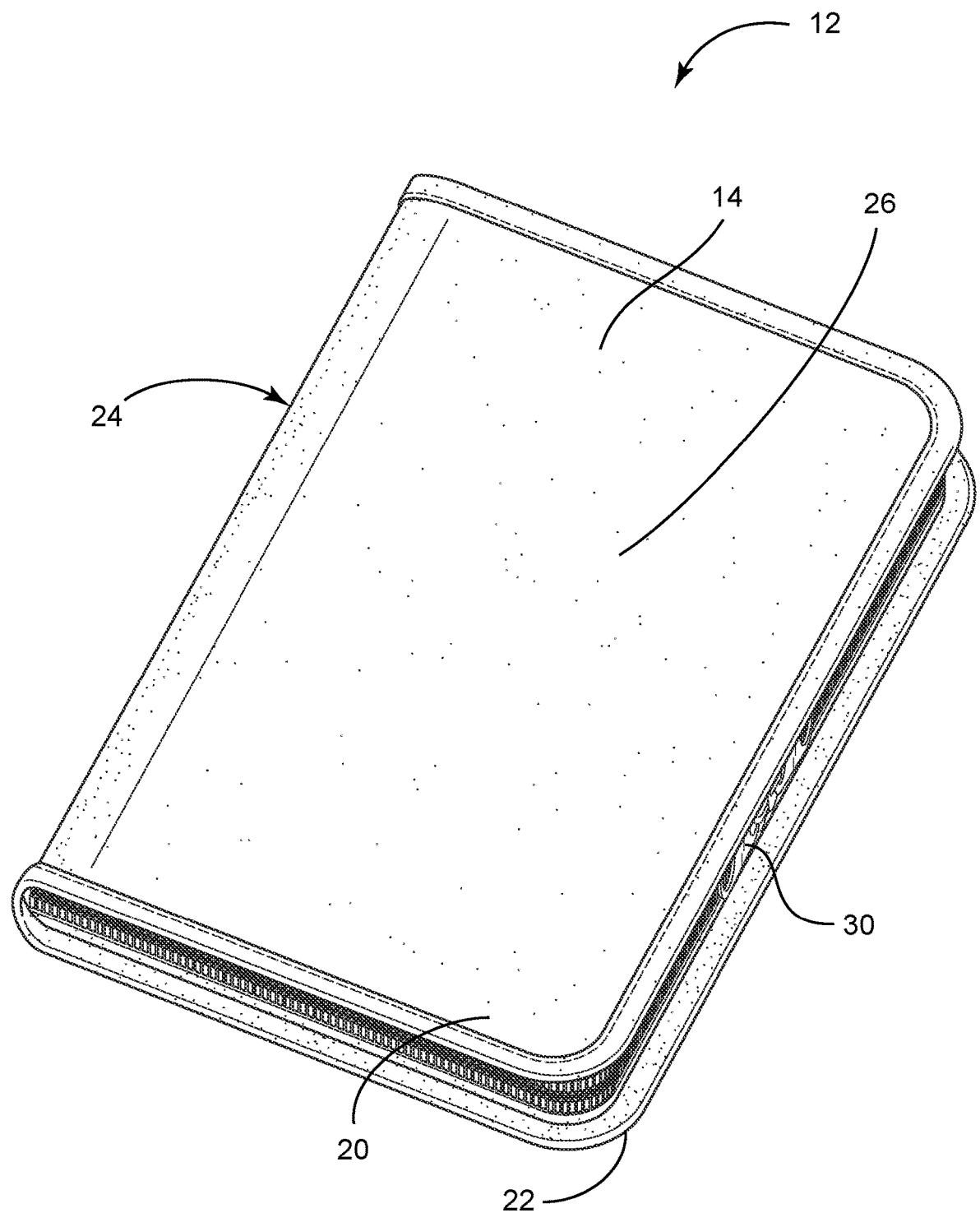
FIG. 3 is another perspective view of an organizer, of a modular tool bag system, in a closed configuration, according to an embodiment.
Figure 4:
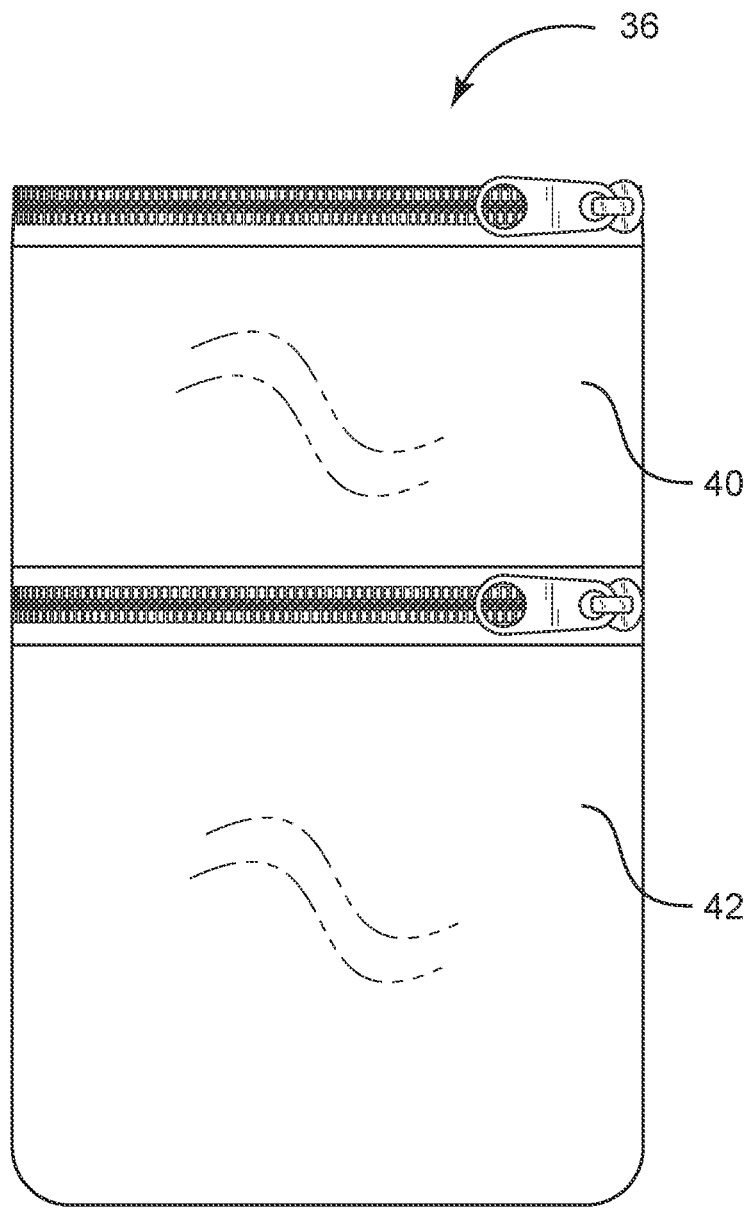
FIG. 4 is a front perspective view of a pouch of a modular tool bag system, according to an embodiment.
Figure 5:
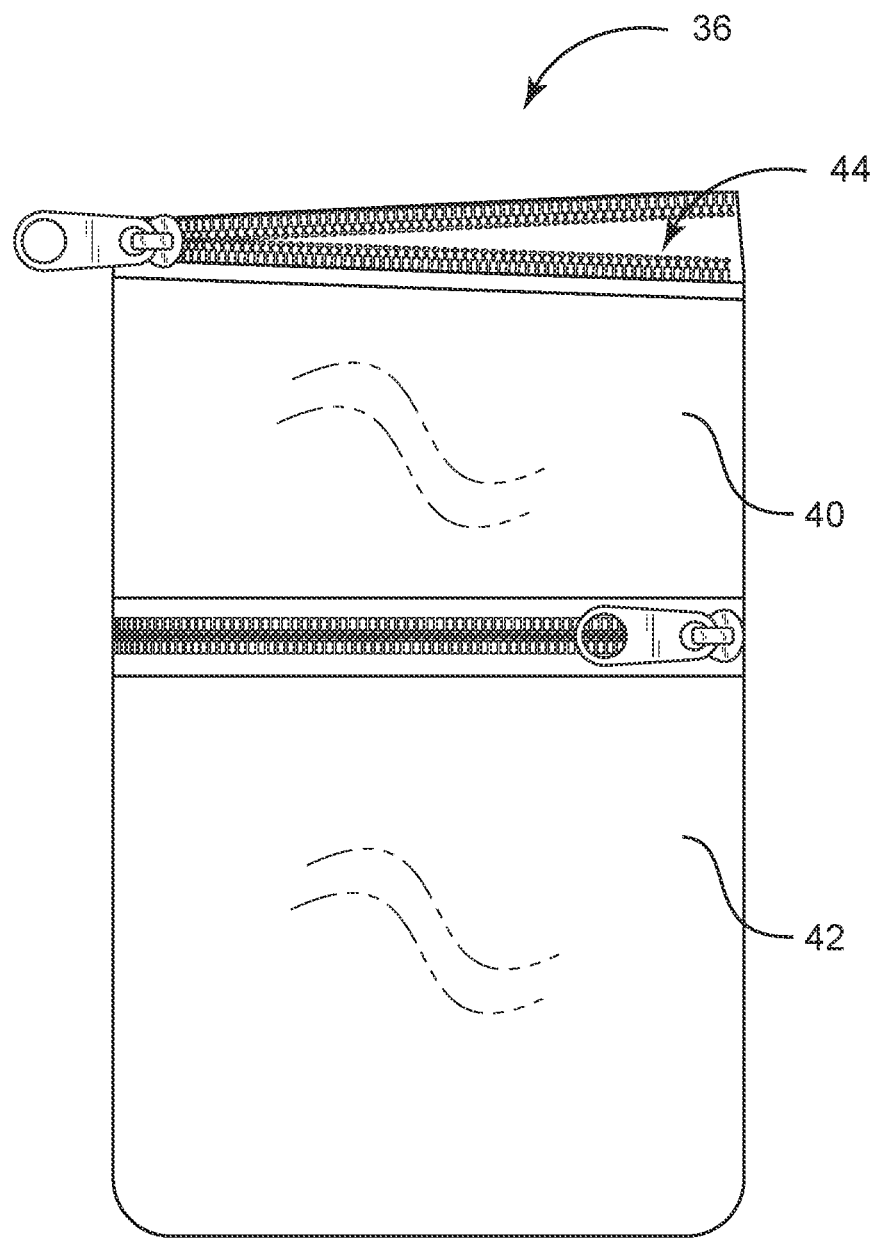
FIG. 5 is another front perspective view of a pouch of a modular tool bag system, according to an embodiment.
Figure 6:
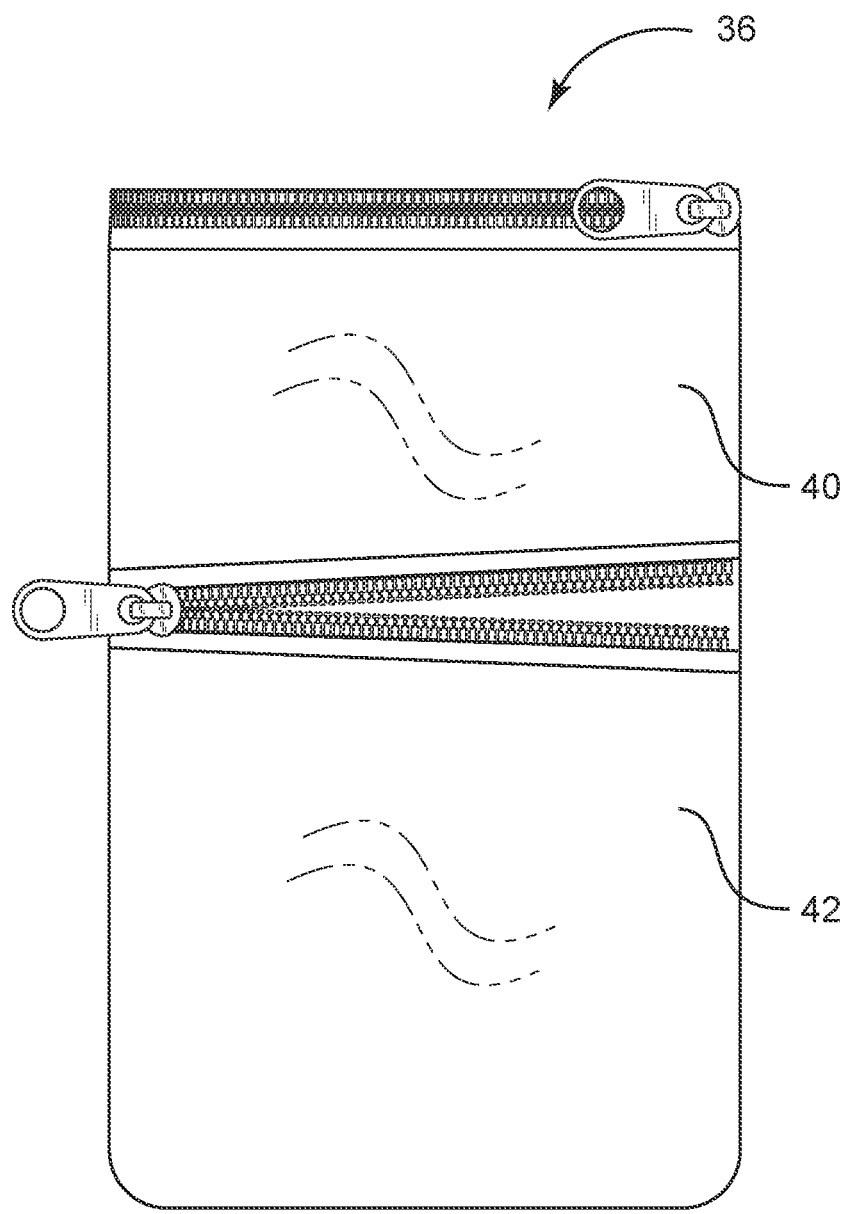
FIG. 6 is yet another front perspective view of a pouch of a modular tool bag system, according to an embodiment.
Figure 7:
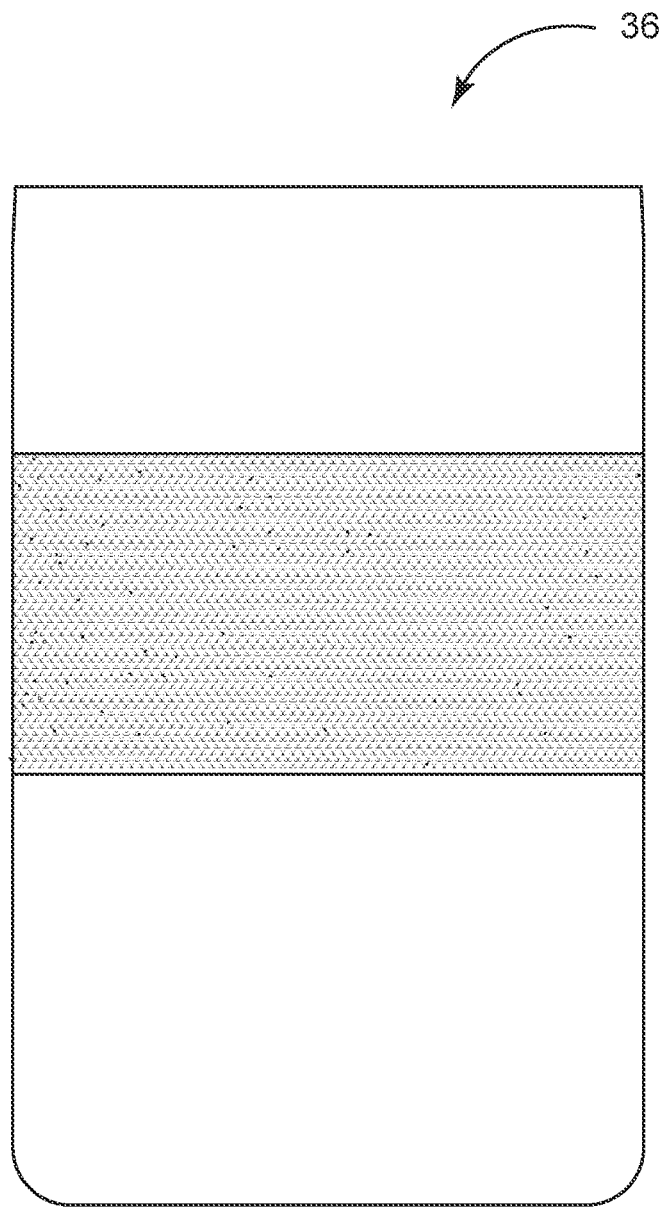
FIG. 7 is a rear perspective view of a pouch of a modular tool bag system, according to an embodiment.
Figure 8:
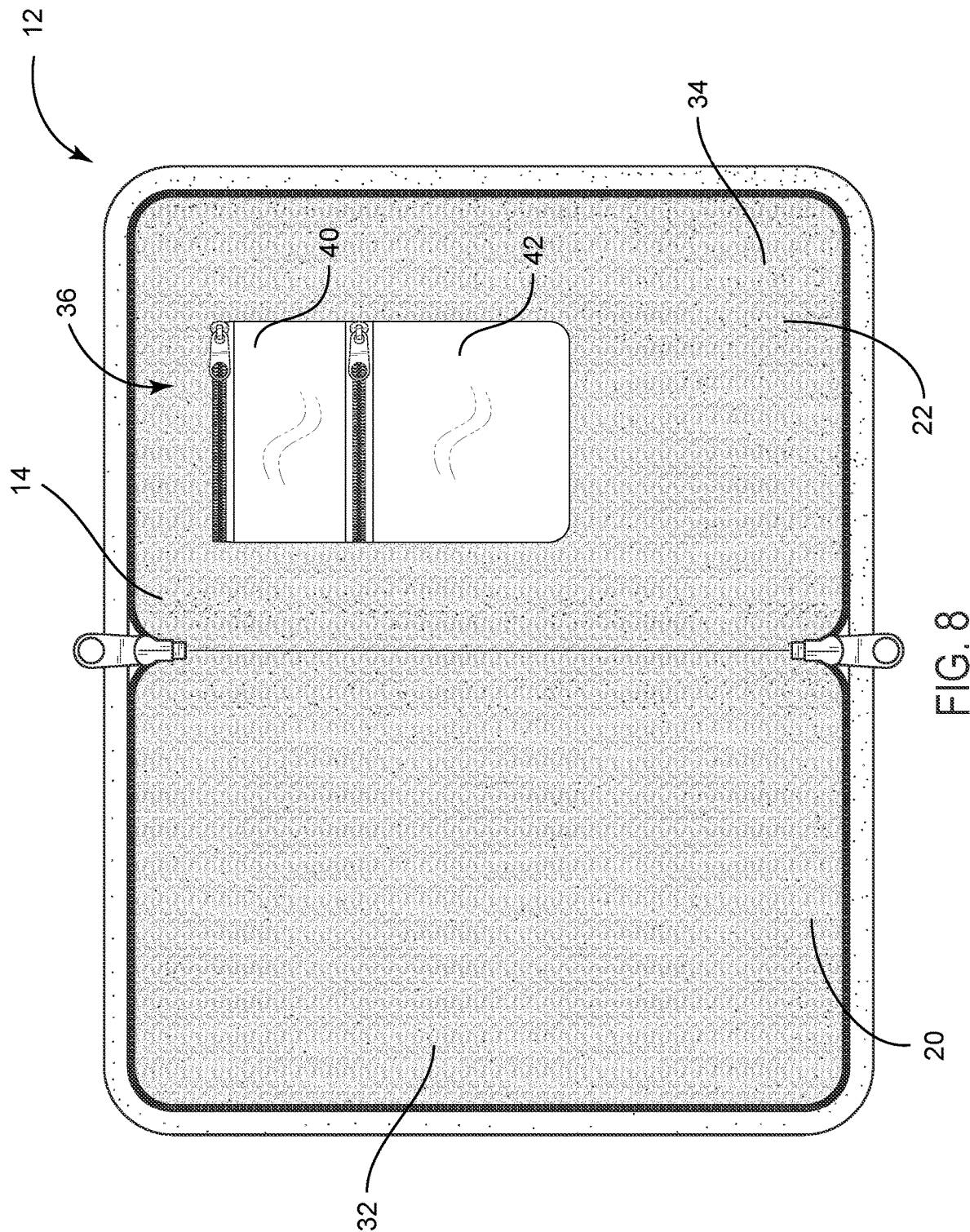
FIG. 8 is a perspective view of a pouch coupled to an inner surface of an organizer of a modular tool bag system, according to an embodiment.
Figure 9:
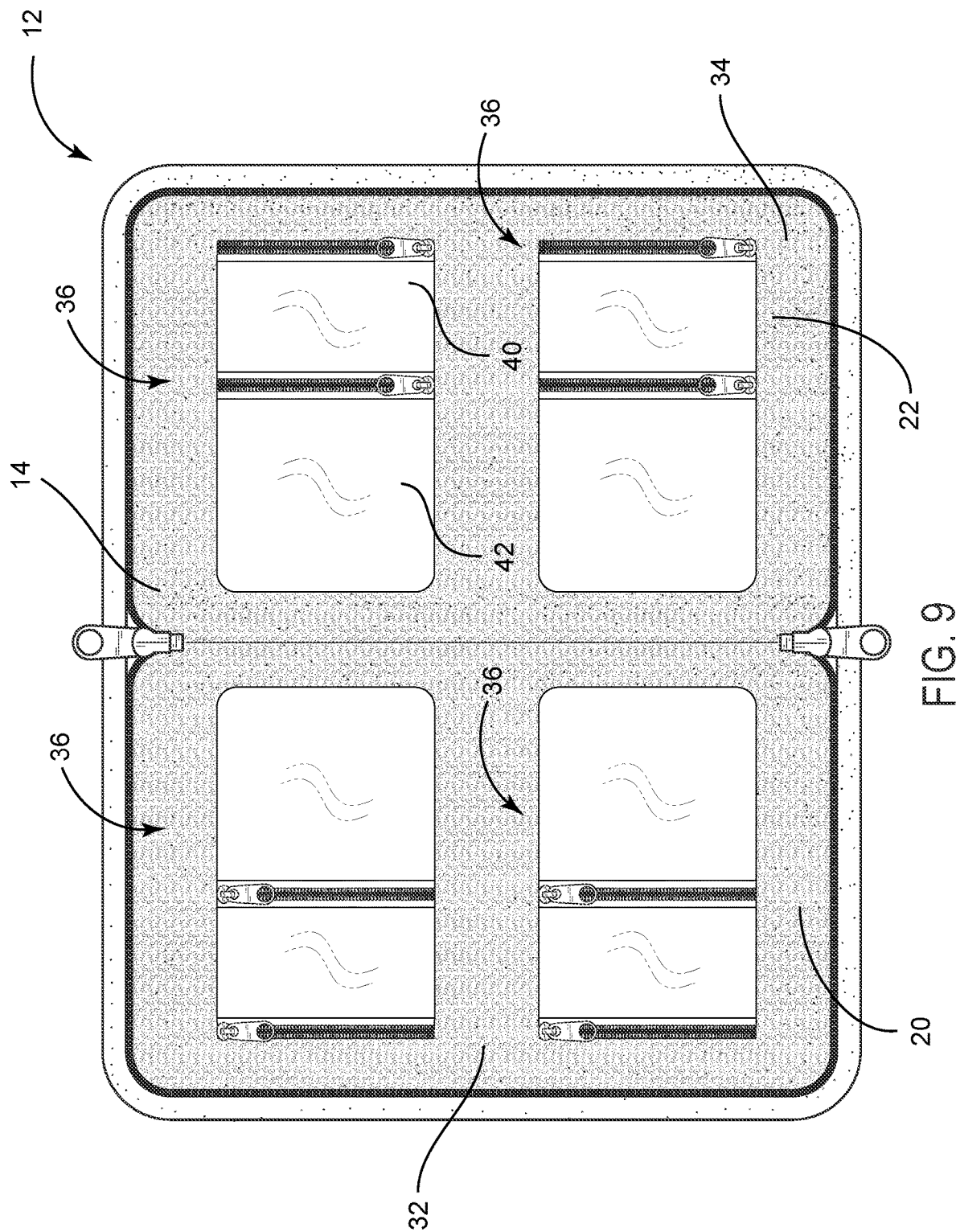
FIG. 9 is a perspective view of a plurality of pouches coupled to an inner surface of an organizer of a modular tool bag system, according to an embodiment.
Figure 10:
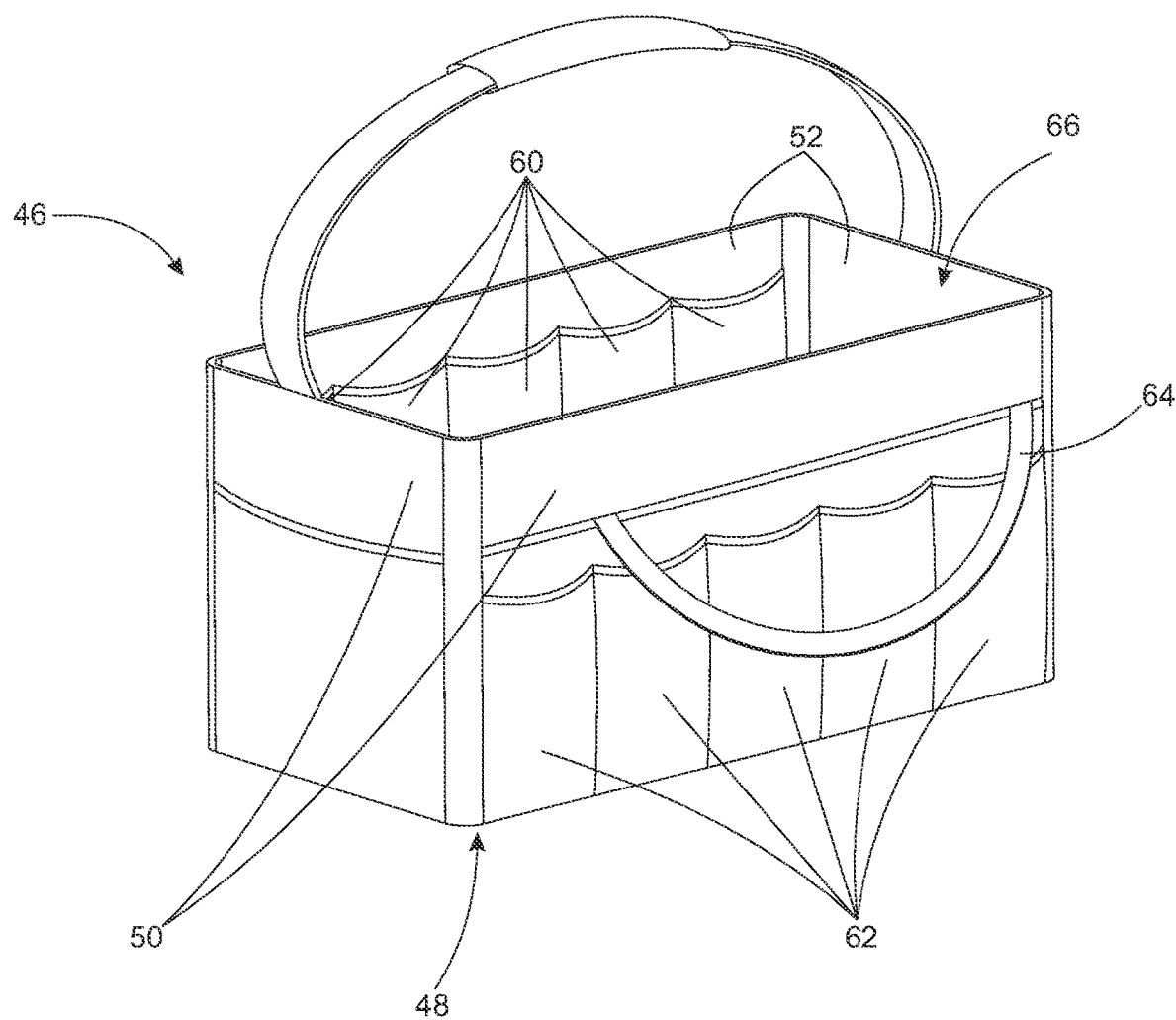
FIG. 10 is a perspective view of a tool bag of a modular tool bag system, according to an embodiment.
Figure 11:
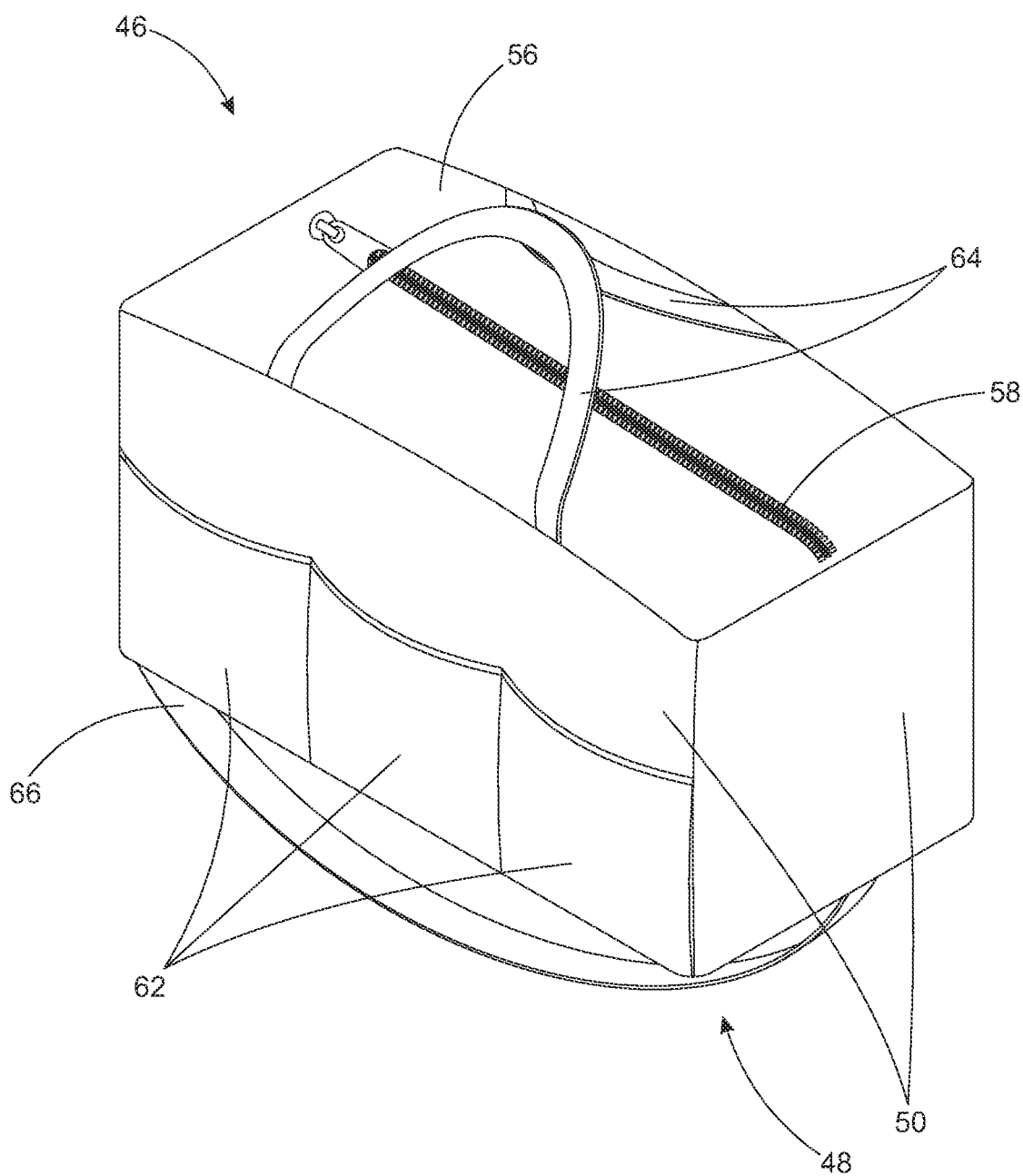
FIG. 11 is a perspective view of a tool bag of a modular tool bag system, according to an alternative embodiment.
Figure 12:
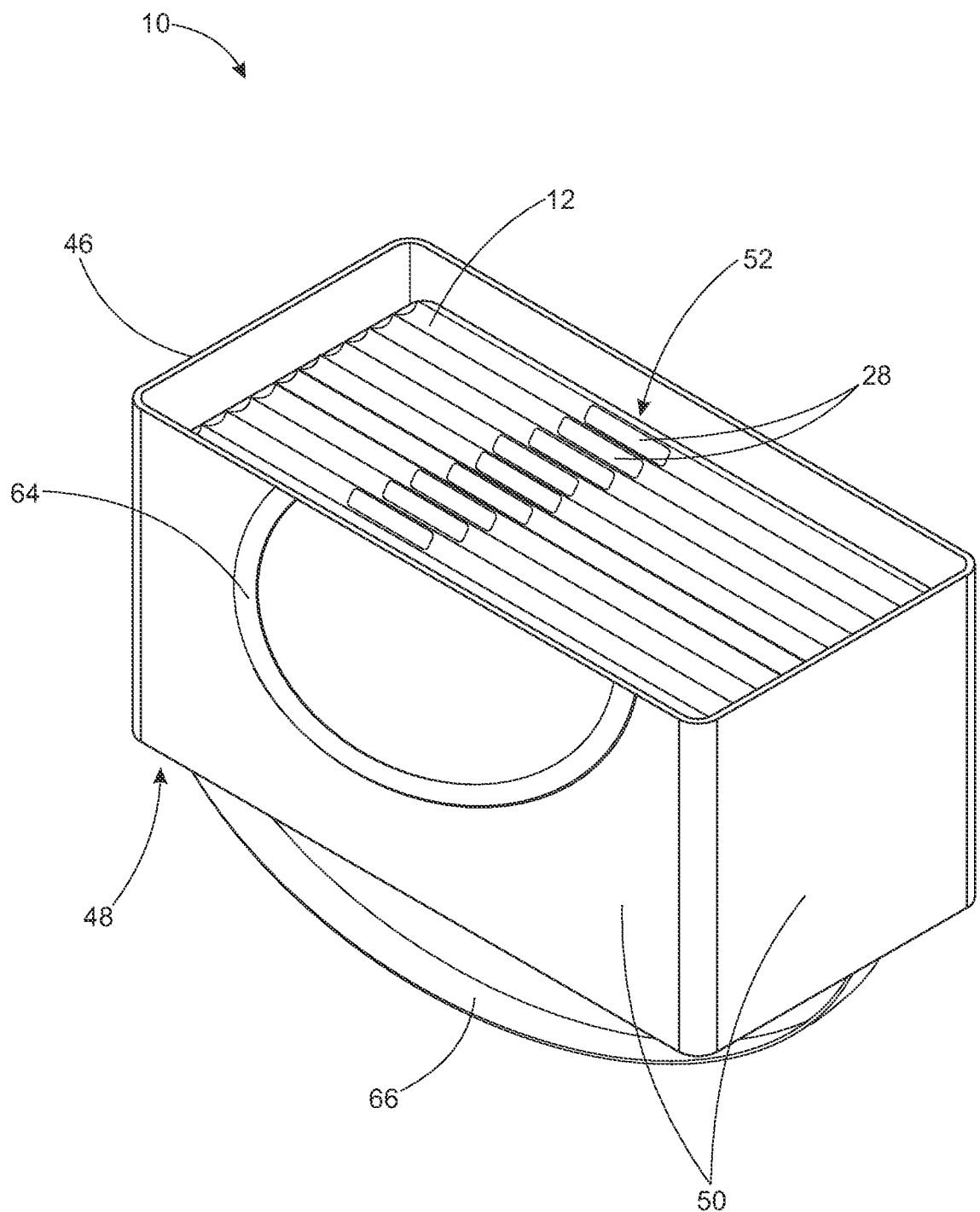
FIG. 12 is a perspective view of a modular tool bag system, wherein a plurality of organizers are contained within a tool bag, according to an embodiment.

As discussed above, embodiments of the present invention relate to tool bags and particularly to a modular tool bag system.

A modular tool bag system 10 may comprise at least one organizer 12 comprising a substantially planar body 14 that is foldable along a midline 16 thereof to form an inner volume 18 between two halves 20 and 22 thereof. The at least one organizer 12 may be transitioned between a closed configuration, wherein the two halves 20 and 22 are folded together, and an open configuration, wherein the two halves 20 and 22 are configured to lay flat on a supporting surface. It is an advantage of the at least one organizer 12 of a modular tool bag system 10 that the at least one organizer 12 may be laid completely flat, with no resistance, on a supporting surface when in an open configuration. In some embodiments, a spine 24 may be formed on an outer surface 26 of the at least one organizer 12 in a closed configuration along the folded midline 16 thereof, wherein any of a label 28, a marker not shown, a writing, a colored element, or other identifying element, or the like, or any combination thereof, may be coupled to the spine 24 for identification of the at least one organizer 12. In this sense, when the at least one organizer 12 is in a closed configuration, it may resemble a closed book with a spine. In some embodiments, an organizer 12 may be secured in a closed configuration along three open sides by a zipper 30 coupled thereto. Some embodiments may alternatively comprise any of a variety of closure devices coupled thereto, such as a snap, a clasp, or the like, or any combination thereof, for reversibly securing the organizer 12 in a closed configuration.

In some embodiments, the at least one organizer 12 may comprise an inner surface 32 lined with a loop fabric 34 of a hook and loop fastener. The at least one organizer 12 may further comprise at least one pouch 36 removably coupled to the inner surface 32 thereof by a hook fabric 38 of a hook and loop fastener, wherein the hook fabric 38 is coupled to the at least one pouch 36. For example, in a preferred embodiment, a plurality of pouches 36, each of the plurality of pouches 36 having a hook fabric 38 coupled to a rear surface 44 thereof, may be removably coupled to the loop fabric 34 lining the inner surface 32 of each of the at least one organizer 12. Each of the plurality of pouches 36 may be easily removed from the organizer 12 and replaced again. However, the hook and loop fastener 34 and 38 is not intended to be limiting. Each of the plurality of pouches 36 may be alternatively removably coupled to the inner surface 32 of the at least one organizer 12 by any of a variety of other suitable means, known now or in the future, to a person of ordinary skill in the art, such as by a snap connector, or the like, or any combination thereof, for example.

In a preferred embodiment, the at least one pouch 36 may comprise at least one main zippered pocket 40 and at least one secondary zippered pocket 42 coupled to the at least one main zippered pocket 40, wherein the at least one secondary zippered pocket 42 is smaller in size than the at least one main zippered pocket 40, wherein each of the pockets 40 and 42 is configured for containing tools, wherein each of the pockets 40 and 42 may be transparent except the rear surface 44 of the at least one pouch 36 may be opaque. However, this is not intended to be limiting. In some embodiments, the at least one pouch 36 may comprise only one main zippered pocket 40 and no secondary pocket. In some embodiments, any pocket 40 and 42 of the at least one pouch 36 may be opaque. Also, in some embodiments, any pocket 40 and 42 of the at least one pouch 36 may be zippered, or not zippered, or may be open or closable by any other suitable means, such as by a snap, buckle, or other like closure, for example. In addition, in a preferred embodiment, the pockets 40 and 42 may be made of flexible materials.

A modular tool bag system 10, of the present invention, may further comprise a tool bag 46 having a bottom wall 48 and a plurality of side walls 50 cooperating to form a storage area 52 configured to receive tools or configured to receive a plurality of organizers 12. Some embodiments may be open at the top 54, while other embodiments may further comprise a top wall 56 for enclosing a top opening thereof. Some embodiments may comprise a closure device 58, such as a zipper, a snap, a clasp, or the like, for securing the top opening. Some embodiments may comprise any of a variety of interior and/or exterior pockets 60 and 62 and/or storage compartments coupled thereto. Some embodiments may comprise any of a variety of handles 64 and/or shoulder straps 66 coupled thereto for accommodating carrying of the tool bag 46 by a user. Any of the bottom wall 48, the plurality of side walls 50 and/or the top wall 56, or any combination thereof, may be made of any of a variety of flexible and/or rigid materials, or combinations thereof.

In some embodiments, a plurality of organizers 12 may be inserted into the tool bag 46. In a preferred embodiment, a plurality of organizers 12 may be inserted, parallel to each other, into the tool bag 46, such that the spines 24 of the organizers 12 remain visible through the tool bag opening when the tool bag 46 is open. In exemplary practice, each of a plurality of pouches 36 of each of a plurality of organizers 12 of a modular tool bag system 10 may be configured to contain a specific tool, or set of tools, for use for a specific purpose. In use, for example, a user may view or read the labels 28 or other identifying elements to identify a particular organizer 12 within the tool bag 46 to select the appropriate organizer 12 containing a specific desired tool or set of tools. The selected organizer 12 may be easily removed by sliding it out of the tool bag 46. The user may then open the organizer 12, laying it flat on a supporting surface in a desired location near a work area. The user may then select an appropriate pouch 36 containing a desired set of tools, wherein, if the pouch 36 is transparent, the user may identify the appropriate pouch 36 by viewing the tools contained therein through a transparent surface thereof. If desired, the user may then remove the appropriate pouch 36 from the organizer 12 to make the selected pouch 36 even more readily accessible at the work area. The user may then proceed to remove a tool, or tools from the pouch 36 for use at the work area. After completing use of the tool, or tools, the tool, or tools, may be replaced into the pouch 36, the pouch 36 secured to the inner surface of the organizer 12, the organizer 12 closed and replaced into position within the tool bag 46 with the spine 24 remaining visible.

A pouch 36 of a modular tool bag system 10 is not limited to configuration for containing tools. A pouch 36 may be configured to contain any materials suitable for containment within a pouch 36. It is understood that, in various embodiments of a pouch 36 of a modular tool bag system 10, the sizes, number of pockets 40 and 42, and configurations of pockets 40 and 42 of a pouch 36 may vary.

Figure 13:
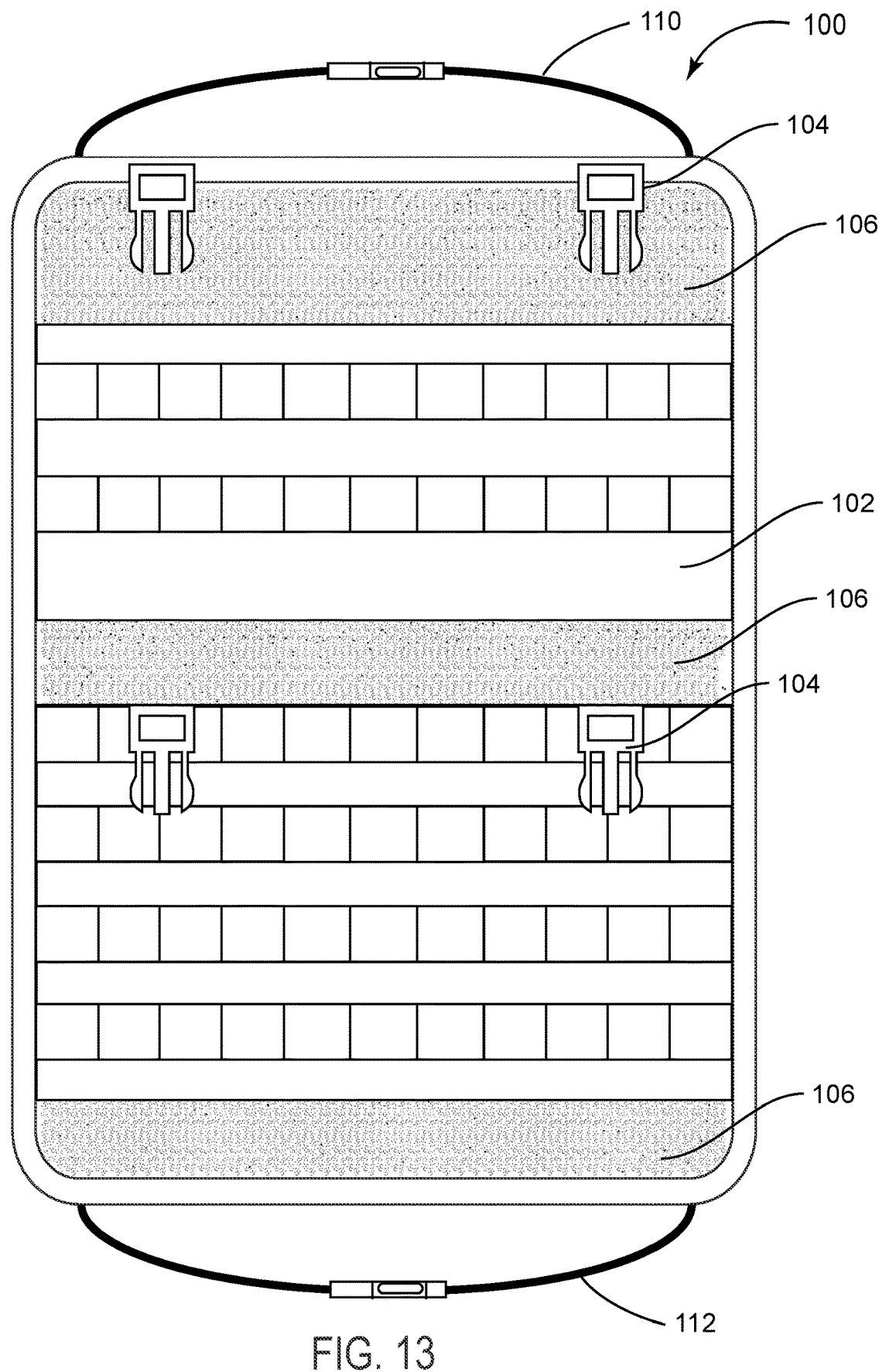
FIG. 13 is a perspective view of a mount for securing organizers to behind a seat of a vehicle, according to an embodiment.

Referring to FIG. 13, the modular tool bag system 10 may further include seat mount 100 according to some embodiments. The seat mount 100 may include a body portion 102 with mounting devices 104, such as buckles, clips or the like. The body portion 102 may also include fastening portions 106 that may be formed of hook fabric or loop fabric for use with hook and loop fasteners. The organizers 12 may include corresponding mounting device to removably couple to the mounting devices 104. The organizers 12 may include hook fabric or loop fabric to couple to the fastening portions 106. In some embodiments, the organizers 12 may be coupled to the seat mount 100 by use of both the mounting devices 104 and/or fastening portions 106. The seat mount 100 may be configured to couple to a back of a seat of a vehicle. For example, and without limitation, the seat mount may include an upper strap 110 and a lower strap 112 that can be coupled to the seat and mount parallel to a back of the seat. The seat mount 100 operates to mount a plurality of organizers 12 to a back of a seat of a vehicle.

The components defining any modular tool bag system may be formed of any of many different types of materials or combinations thereof that can readily be formed into shaped objects provided that the components selected are consistent with the intended operation of a modular tool bag system. For example, the components may be formed of: rubbers (synthetic and/or natural) and/or other like materials; glasses (such as fiberglass) carbon-fiber, aramid-fiber, any combination thereof, and/or other like materials; polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; composites and/or other like materials; metals, such as copper, zinc, magnesium, titanium, copper, iron, steel, carbon steel, alloy steel, tool steel, stainless steel, aluminum, any combination thereof, and/or other like materials; alloys, such as aluminum alloy, titanium alloy, magnesium alloy, copper alloy, any combination thereof, and/or other like materials; any other suitable material; and/or any combination thereof.

Furthermore, the components defining any modular tool bag system may be purchased pre-manufactured or manufactured separately and then assembled together.

However, any or all of the components may be manufactured simultaneously and integrally joined with one another. Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld, a fastener (e.g. a bolt, a nut, a screw, a nail, a rivet, a pin, and/or the like), wiring, sewing, any combination thereof, and/or the like for example, depending on, among other considerations, the particular material forming the components. Other possible steps might include sand blasting, polishing, powder coating, zinc plating, anodizing, hard anodizing, and/or painting the components for example.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. A modular tool bag system comprising:
   a plurality of organizers, each organizer comprising a substantially planar body that is foldable along a midline thereof to form an inner volume between inner surfaces of two halves thereof, wherein the at least one organizer is moveable between a closed configuration with the two halves folded together and an open configuration with the two halves lying completely flat on a supporting surface with the inner surfaces of the two halves exposed, and each organizer comprising a mounting device and one of hook fabric or loop fabric; and
   a seat mount comprising an upper coupler and a lower coupler to couple the seat mount to a back of seat, a plurality of mounting devices and fastener portions, wherein the fastener portions are one of loop fabric or hook fabric, wherein each organizer of the plurality of organizers is releasably coupled to the seat mount with the mounting device of each organizer coupled one mounting device of the plurality of mounting devices of the seat mount and the one of hook fabric or loop fabric of each organizer coupled to the fastener portions of the seat mount.

2. The system of claim 1, wherein the each organizer further comprises a zipper to secure the at least one organizer in the closed configuration along three open sides.

3. The system of claim 1, wherein the inner surfaces of each organizer are lined with a loop fabric of a hook and loop fastener.

4. The system of claim 3, further comprising at least one pouch removably coupled to the inner surface of one of the two halves of the organizer by a hook fabric of the hook and loop fastener.

5. The system of claim 4, further comprising one more additional pouches removably coupled to the inner surface of one of the two halves of each organizer by a hook fabric of the hook and loop fastener.

6. The system of claim 2, wherein the at least one pouch comprises at least one main zippered pocket for containing tools, wherein the at least one main zippered pocket is transparent except a rear surface of the pouch, which is opaque.

* * * * *